US010393128B2

(12) United States Patent
Urac et al.

(10) Patent No.: US 10,393,128 B2
(45) Date of Patent: Aug. 27, 2019

(54) TRANSLATING GASPATH BLEED VALVE

(71) Applicant: Pratt & Whitney Canada Corp., Longueuil (CA)

(72) Inventors: Tibor Urac, Mississauga (CA); Karan Anand, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 608 days.

(21) Appl. No.: 14/721,015

(22) Filed: May 26, 2015

(65) Prior Publication Data

US 2016/0348685 A1 Dec. 1, 2016

(51) Int. Cl.
| F04D 27/02 | (2006.01) |
| F02C 6/08 | (2006.01) |
| F02C 7/05 | (2006.01) |
| F04D 27/00 | (2006.01) |
| F02K 3/075 | (2006.01) |

(52) U.S. Cl.
CPC ............ *F04D 27/0215* (2013.01); *F02C 6/08* (2013.01); *F02C 7/05* (2013.01); *F02K 3/075* (2013.01); *F04D 27/009* (2013.01); *F04D 27/023* (2013.01); *F05D 2240/55* (2013.01); *F05D 2260/57* (2013.01); *F05D 2260/606* (2013.01); *F05D 2260/607* (2013.01)

(58) Field of Classification Search
CPC .. F04D 27/0215; F04D 27/023; F04D 29/083; F04D 29/522; F04D 27/009; F04D 27/0207; F02K 3/075; F02C 6/08; F02C 7/05; F02C 9/18; F02C 9/52; F05D 2240/55; F05D 2260/57; F05D 2260/606; F05D 2260/607

USPC .......................................................... 415/145
See application file for complete search history.

(56) References Cited

U.S. PATENT DOCUMENTS

| 3,588,268 | A | 6/1971 | Hampton |
| 4,674,951 | A | 6/1987 | Jourdain et al. |
| 4,679,982 | A | 7/1987 | Bouiller et al. |
| 5,845,482 | A | 12/1998 | Carscallen |
| 7,624,581 | B2 | 12/2009 | Moniz |
| 7,785,066 | B2 | 8/2010 | Bil et al. |
| 8,944,754 | B2 | 2/2015 | Pichel |
| 2012/0288359 | A1* | 11/2012 | Pichel ...................... F02C 9/18 |
| | | | 415/145 |
| 2014/0245747 | A1* | 9/2014 | Pritchard, Jr. ........ F01D 17/105 |
| | | | 60/782 |

(Continued)

FOREIGN PATENT DOCUMENTS

DE 19834530 A1 * 2/2000 ........... F01D 17/105

OTHER PUBLICATIONS

EPO, English Translation of Description DE19834530, retrieved on Oct. 10, 2017.*

*Primary Examiner* — Carlos A Rivera
*Assistant Examiner* — Jesse M Prager
(74) *Attorney, Agent, or Firm* — Norton Rose Fulbright Canada LLP

(57) ABSTRACT

A bleed of valve comprises a ring axially translatable between a retracted position in which the ring is configured to close an annular bleed off opening defined in a converging portion of a radially outer annular wall of a gas turbine engine gaspath and a deployed position in which the ring protrudes into the gaspath to mechanically scoop out incoming air and water/hail particles.

19 Claims, 4 Drawing Sheets

(56) References Cited

U.S. PATENT DOCUMENTS

2015/0027130 A1 1/2015 LeBlanc et al.
2015/0159560 A1* 6/2015 Kumar ..................... F02C 9/18
60/779

* cited by examiner

TRANSLATING GASPATH BLEED VALVE

TECHNICAL FIELD

The application relates generally to gas turbine engines and, more particularly, to a bleed off valve (BOV) arrangements.

BACKGROUND OF THE ART

Conventional compressor bleed off valve (BOV) arrangements generally consists of a 360 degrees radial off take on the outer gaspath from which bleed air is extracted from the core flow and routed to the bypass air stream. Such BOV arrangements have a piston that closes off a bleed passage somewhere in-between the core gaspath and the bypass gaspath and relies on the pressure differential between these two gaspaths to draw out bleed air from the core flow. Since the sealing piston is located away from the core gaspath, the radial off take generates some pressure losses as the core flow passes under it, even when the BOV is closed.

BOVs may also be used to extract water and hail from the core gaspath when the BOV is open, thus reducing the concentration of water (referred to as Water to Air ratio—WAR) going into the—compressor, which can lead to combustor flame out when WAR get too high. However, conventional BOVs have heretofore only relied on bleed air flow to redirect the particles trajectories and that with limited success especially at low engine operating conditions, where the static pressure delta between the core gaspath and the bypass passage is not sufficient by itself to carry the hail and water particles out of the core gaspath through the bleed off passage.

SUMMARY

In one aspect, there is provided a bleed off valve (BOV) for a gas turbine engine having a gaspath bounded by a radially outer annular wall extending about an axis of the gas turbine engine, the radially outer annular wall having a converging portion; the BOV comprising: a ring axially translatable between a retracted position in which the ring is configured to close an annular bleed off opening defined in the converging portion of the radially outer annular wall and a deployed position in which the ring is configured to protrude into the gaspath; and an actuator operatively connected to the ring to axially translate the ring between the retracted and deployed positions.

In another aspect, there is provided a gas turbine engine comprising: a compressor having a gaspath bounded by a radially outer annular wall extending about an axis of the engine, the radially outer annular wall having a converging portion; a bleed off valve (BOV) having a ring axially translatable between a retracted position in which the ring closes an annular bleed off opening defined in the converging portion of the radially outer annular wall and a deployed position in which the ring protrudes forwardly into the gaspath, and an actuator operable to axially translate the ring between the retracted and the deployed positions.

In a further aspect, there is provided a method of extracting water/hail particles and/or air from a core gaspath of a compressor of a gas turbine engine, the method comprising: displacing a ring from a retracted position in which the ring closes a corresponding annular bleed off opening defined in a converging portion of a radially outer annular wall of the core gaspath to a deployed position in which the ring protrudes axially forwardly into the core gaspath to scoop water/hail particles and/or air out of the core gaspath via the annular bleed off opening.

DESCRIPTION OF THE DRAWINGS

Reference is now made to the accompanying figures in which.

DETAILED DESCRIPTION

Figure 1:
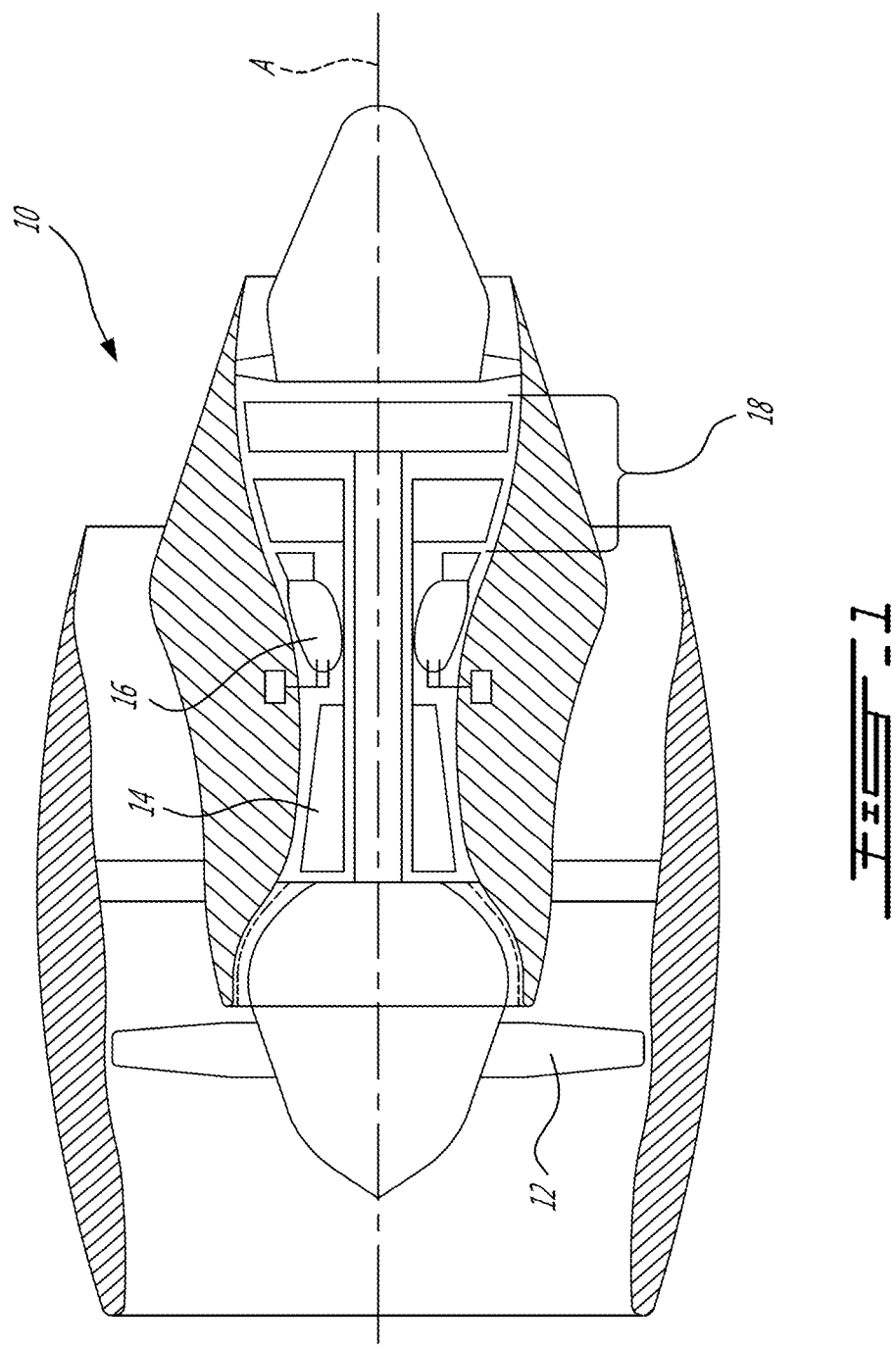
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor 14 for pressurizing the air, a combustor 16 in which the compressed air is mixed with fuel and ignited for generating an annular stream of hot combustion gases, and a turbine 18 for extracting energy from the combustion gases.

Figure 2:
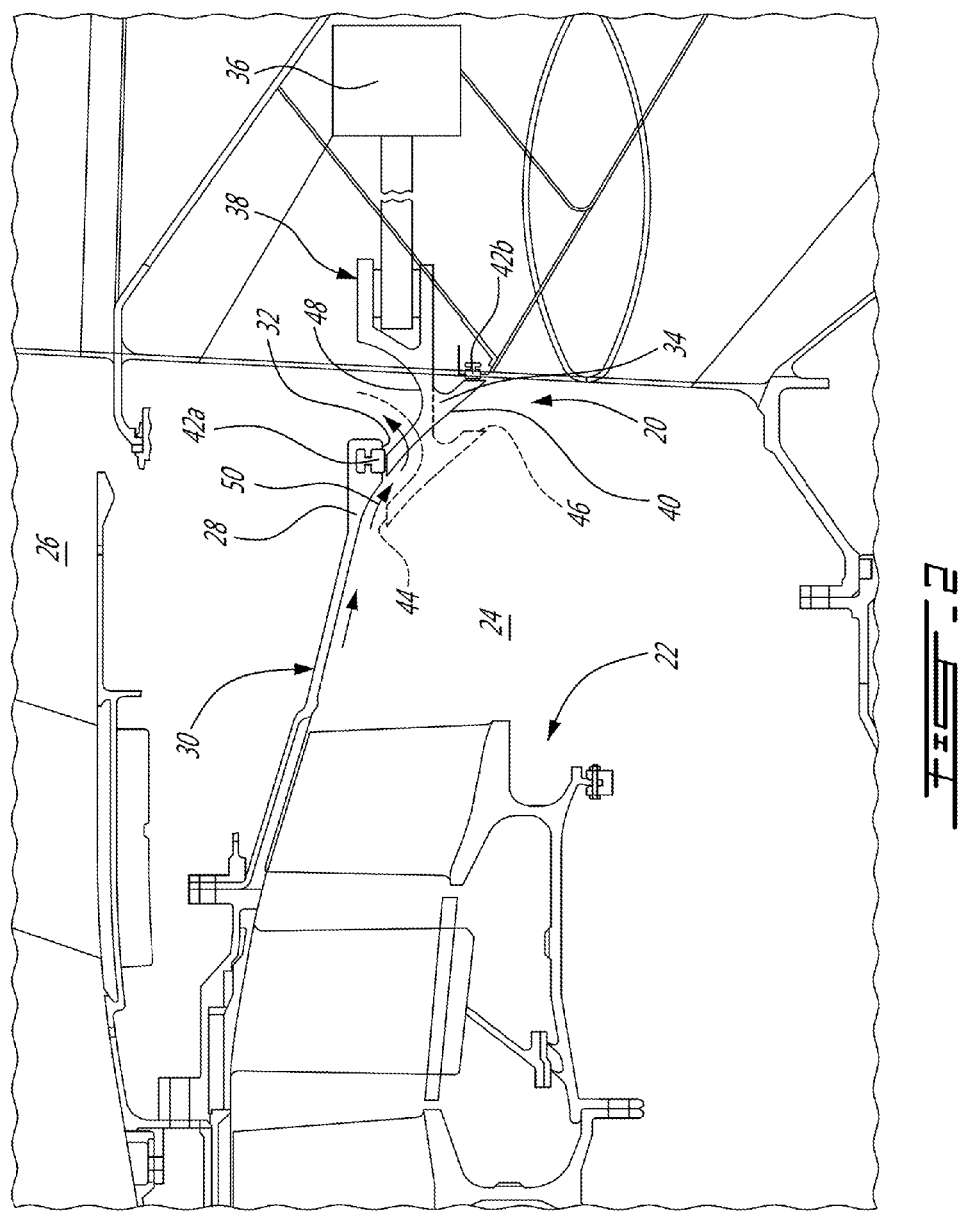
FIG. 2 is an enlarged cross-sectional view of a low pressure (LP) compressor section of the engine and schematically illustrating the operation of a bleed off valve including a piston ring which is axially translatable into the gaspath of the compressor section for mechanically scooping air and water/hail particles out the gaspath.

FIG. 2 illustrates a low pressure (LP) compressor section of the compressor 14. As can be appreciated from FIG. 2, a bleed off valve (BOV) 20 is provided downstream from a LP compressor stage, including a LP compressor rotor 22, for selectively bleeding air from a core gaspath 24 of the compressor 14 to a bypass passage 26 disposed radially outwardly from the core gaspath 24. As will be seen hereinafter, the BOV 20 is configured to also serve a function of extracting water and hail particles from the core gaspath 24 so as to reduce the concentration of water contained into the pressurized air that is directed into the combustor 16.

The BOV 20 is provided in a gaspath wall having a converging portion, such as the constricting conical portion 28 of the radially outer annular wall 30 of the gaspath 24, for selectively opening and closing an annular bleed off opening 32 strategically defined in the converging wall portion. The term "conical portion" is herein intended to generally refer to an annular wall geometry which converges radially inwardly in a downstream direction relative to a flow of fluid through the engine 10. The constricting geometry of the gaspath could also be generally referred to as a falling portion. As schematically illustrated in FIG. 2, the BOV 20 generally comprises a ring 34 operatively connected to an actuator 36 via a suitable linkage arrangement 38. According to an embodiment, the ring 34 is provided in the form of a circumferentially continuous solid ring having a one-piece or unitary body. According to another aspect, the actuator 36 comprises a single actuator unit. However, it is understood that the actuator 36 could comprise more than one unit along the circumference of the ring 34.

The actuator 36 is operable to selectively axially translate the ring 34 between a retracted position (shown in solid lines in FIG. 2) in which the ring 34 closes the bleed off opening 32 directly at the gaspath outer boundary and a deployed position (shown in broken lines in FIG. 2) in which the ring 34 protrudes forwardly into the gaspath 24. It is understood that the axial direction is herein generally defined in relation to axis A (FIG. 1) of the engine 10.

According to the embodiment shown in FIG. 2, when the ring 34 is in its retracted position, it forms a continuous and smooth flow boundary surface with the radially outer wall 30. That is the gaspath facing surface 40 of the ring 34 is flushed or leveled with the adjacent surface of the radially outer wall 30 of the gaspath 24. This allows to reduce core flow losses when the BOV 20 is closed since it provides for a smooth and continuous outer gaspath surface with much less disruption to the flow.

Figure 3:
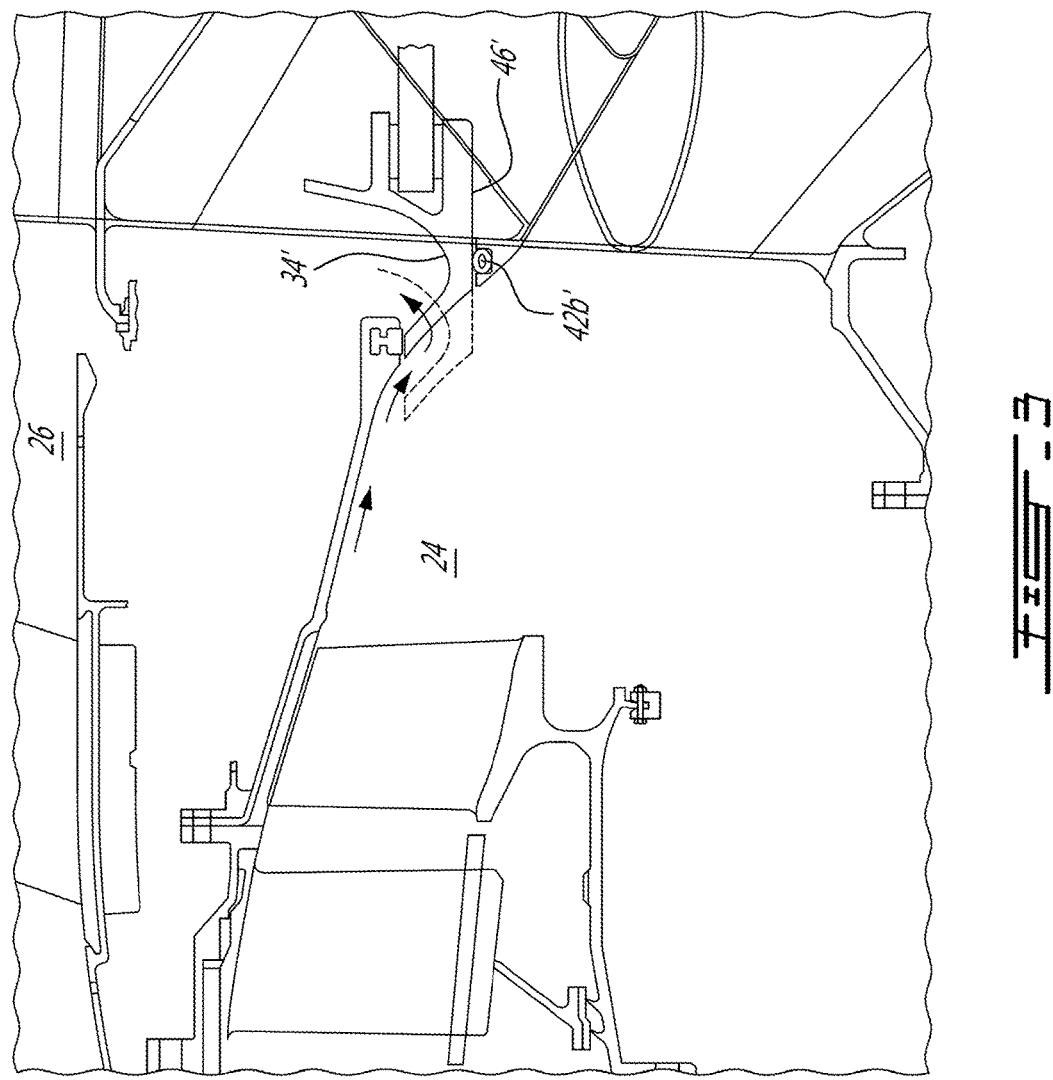
FIG. 3 is an enlarged cross-section view similar to FIG. 2 but illustrating an alternative sealing arrangement for the BOV ring.

Seals 42a, 42b may be provided to minimize flow leakage through the bleed off opening 32 when the ring 34 is in its retracted position. According to the embodiment shown in FIG. 2, seals 42a and 42b are annular seals adapted to be mounted in corresponding seats provided on the radially outer annular wall 30 respectively at the outer and inner diameters of the bleed off opening 32. The ring 34 has a radial sealing surface 44 for sliding engagement with seal 42a. The ring 34 also has an axial sealing surface 46 for axially compressing the seal 42b in sealing engagement. This sealing arrangement thus provides for one sliding seal and one compression seal. However, it is understood that other sealing arrangements are contemplated as well. For instance, as shown in FIG. 3, the axial compression seal at the inner diameter of the bleed off opening 32 could be replaced by a second sliding seal 42b' disposed for axial sliding engagement with a corresponding radially inner sealing surface 46' of the ring 34'. According to another possible application, the seals could be omitted.

Referring back to FIG. 2, it can be seen that the ring 34 has bleed off opening facing surface. The bleed off opening facing surface may be opposite to the gaspath facing surface 40. The bleed off opening facing surface defines a ramp 48 for deflecting the air and the water/hail particles out of the gaspath 24 via the bleed off opening 32. The ramp 48 extends from a leading edge 50 in a radially inwardly converging direction generally following the trajectory of the flow in the conical portion 28 of the radially outer wall 30 of the gaspath 24. The ramp 48 then gradually curves away from the radially inward direction to redirect the captured flow out of the gaspath 24 via the bleed off opening 32. According to the illustrated embodiment, the ramp 48 curves from the radially inwardly converging direction to a generally radially outward direction. This confers to the exemplified ramp 48 a "ski jump" profile. However, it is understood that the ramp could be straight or adopt any other suitable flow deflecting profiles.

In contrast to conventional BOV arrangements which only rely on static pressure differences between the core gaspath and the bypass passage, it is herein proposed to use the total pressure rather than just the static pressure to drive the bleed flow. As described above, this may be achieved by deploying the ring 34 of the BOV 20 directly into the gaspath 24 to mechanically redirect or deflect the incoming flow. Indeed, extraction efficiency can be improved by mechanically scooping the incoming air, water and hail particles out of the gaspath 24. This is particularly advantageous at low power engine operating conditions where the static pressure delta between the core gaspath 24 and the bypass passage 26 is low.

Figure 4:
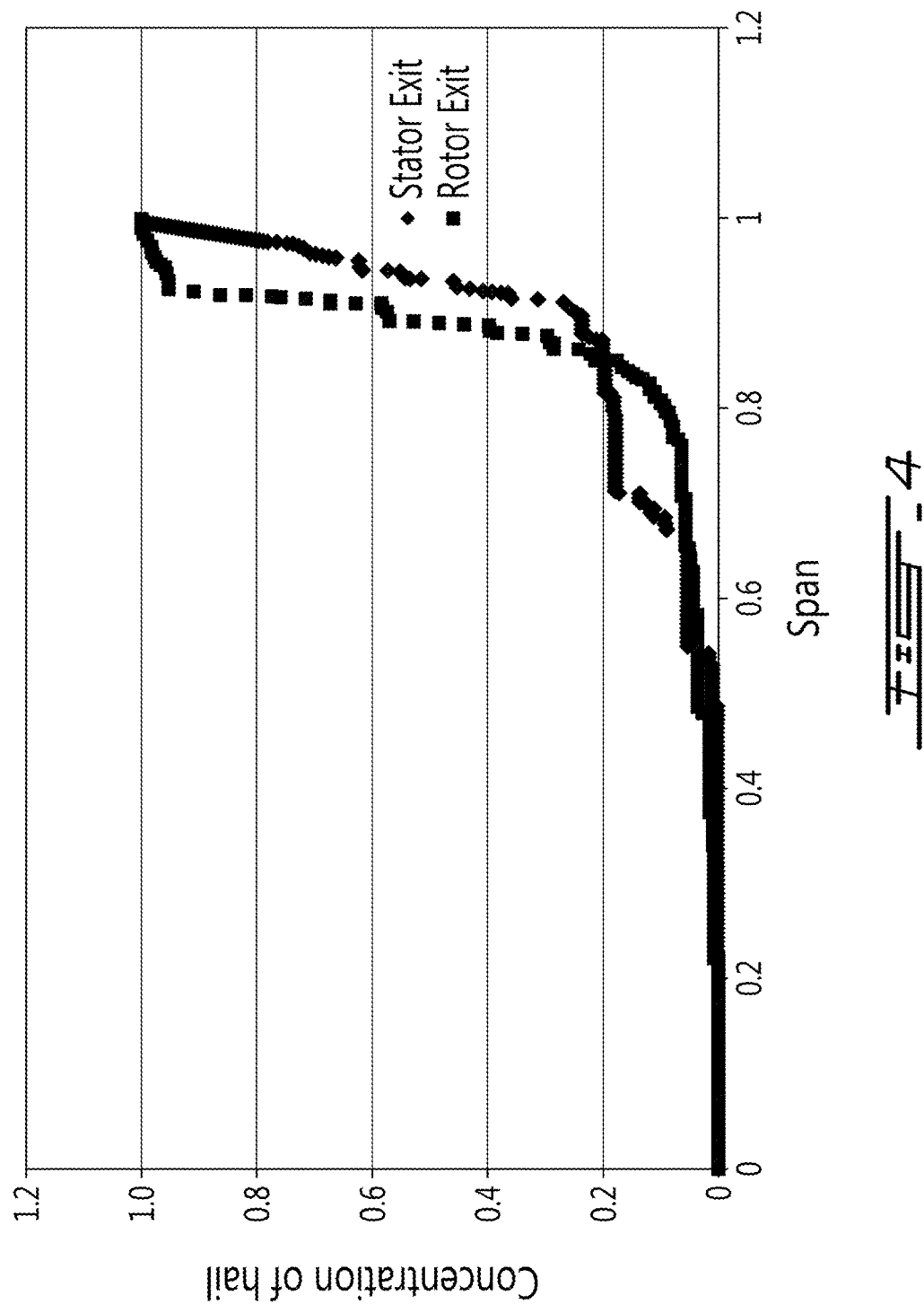
FIG. 4 is a graph illustrating the hail stone mass distribution in the gaspath at an exit of a LP compression stage of the engine, the horizontal axis being normalized to show span; where 0 corresponds to the radially inner gaspath wall and 1 to the radially outer gaspath wall.

As shown in FIG. 4, it has been found, via ingestion particle tracking analysis, that about 80% of ingested hail is concentrated in the outer 15% or so of the core gaspath 24. This can be explained by the fact that as they flows through the LP compressor section, the water and hail particles are centrifuged by the LP compressor rotors to the outer boundary region of the flow stream adjacent to the outer wall 30 of the gaspath 24. Therefore, by positioning the BOV downstream of at least one of the LP compressor rotors, it is possible to take advantage of the centrifugal effect of the rotors to mechanically scoop out a major portion of the water and hail particles carried by the incoming flow of air. In fact, hail extraction in the order of 80% could be achieved with fairly small penetration of the BOV ring 34 into the core gaspath 24. Due to the ballistic nature of hail particles in the core flow, it is more effective to redirect the particles mechanically rather than using bleed air flow to redirect the particle trajectories. Accordingly, the ramp 48 on the ring 34 provides for improved extraction of hail and water since it directly scoops out the water/hail particles contained in the outer region of the flow stream.

Also, by strategically positioning the BOV in the conical or constricting portion of the outer wall 30, it is possible to provide the ring 34 in the form of a single solid ring and to axially translate this single unitary piece into the gaspath 24 for mechanically interacting and extracting air, water and hail. For instance, such a single piece axially translating arrangement would not be possible on an axially extending cylindrical section of the gaspath 24. Indeed, a more mechanically complex BOV system would be required to permit the deployment of a deflecting structure into the outer boundary region of the gaspath 24. The above described embodiments take benefit of the constricting geometry of the gaspath 24 to provide for a mechanically simple, lightweight, easy to install and reliable BOV arrangement. Also, the use of a single translatable ring contributes to simplify the sealing system of the bleed off opening 32. From the foregoing, it can be appreciated that the positioning of the BOV 20 in the conical portion 28 of the radially outer wall 30 of the gaspath 24 allows for BOV designs having numerous advantages.

In use, air as well as water and hail particles can be efficiently extracted from the core gaspath 24 of the compressor 14 by displacing the ring 34 from its retracted position to its deployed position in which the ring 34 protrudes axially forwardly into the core gaspath 24 to mechanically scoop air and water/hail particles directly out of the gaspath 24 via the bleed off opening 32. The actuator 36 axially translates the ring 34 in a forward direction from the retracted position to the deployed position. The back surface of the ring 34 is used to deflect the incoming flow out of the core gaspath 24 of the compressor 14. As depicted by the flow arrows in FIG. 2, the flow is guided along the back surface of the ring 34 from a generally radially inward direction to a generally radially outward direction. As explained herein above, this allows to extract a major portion of water/hail particles since these particles are mainly contained in the outer region of the flow stream as a result of the centrifuging action of the compressor rotors upstream of the ring 34. The bleed flow is then evacuated through the bypass passage 26 which is connected in fluid flow communication with the bleed off opening 32. The above procedure provides for an efficient extraction of the air and water/hail particles even at low power conditions.

The above description is meant to be exemplary only, and one skilled in the art will recognize that changes may be made to the embodiments described without departing from the scope of the invention disclosed. For example, while the BOV has been described as being disposed in the LP compressor section of the engine, it is understood that it could be disposed in other sections of the engine as well. Still other modifications which fall within the scope of the present invention will be apparent to those skilled in the art, in light of a review of this disclosure, and such modifications are intended to fall within the appended claims.

The invention claimed is:

1. A bleed off valve (BOV) for a gas turbine engine having a gaspath bounded by a radially outer annular wall extending about an axis of the gas turbine engine, the radially outer annular wall having a converging portion; the BOV comprising:
a ring axially translatable between a retracted position in which the ring is configured to close an annular bleed off opening defined in the converging portion of the radially outer annular wall and a deployed position in which the ring is configured to protrude into the gaspath, the ring having a leading edge and a trailing edge downstream of the leading edge relative to a flow in the gaspath and located radially inwardly of the leading edge relative to the axis of the gas turbine engine, the leading edge and the trailing edge extending circumferentially around the axis of the gas turbine engine, the ring having a gas path facing surface between the leading edge and the trailing edge to form a section of the radially outer annular wall when in its retracted position, gaps defined between the leading edge and the trailing edge of the ring and the radially outer annular wall when the ring is in the deployed position, both of the gaps fluidly connected to the annular bleed off opening, the gaspath facing surface extending at an angle relative to the axis so as to have an axial component and a radial component, wherein, in the retracted position, the ring is configured to close the annular bleed off opening directly at an outer flow boundary of the gaspath and the gas path facing surface of the ring forms a continuous and smooth flow boundary surface with the radially outer annular wall; and
an actuator operatively connected to the ring to axially translate the ring, and the leading edge and the trailing edge of the ring, between the retracted and deployed positions.

2. The BOV as defined in claim 1, wherein the ring has a bleed off opening facing surface, the bleed off opening facing surface configured to direct a radially inwardly converging flow stream in the converging portion of the radially outer annular wall of the gaspath towards the bleed off opening.

3. The BOV as defined in claim 2, wherein the bleed off opening facing surface defines a ramp extending from the leading edge of the ring in a radially inwardly converging direction, the ramp gradually curving away from the radially inwardly converging direction.

4. The BOV as defined in claim 3, wherein the ramp curves from the radially inwardly converging direction to a radially outward direction.

5. The BOV as defined in claim 2, wherein the bleed off opening facing surface extends in a radially inwardly converging direction from the leading edge of the ring.

6. The BOV as defined in claim 1, wherein in the retracted position, the ring mates with a corresponding annular seal adapted to be mounted to the radially outer annular wall.

7. The BOV as defined in claim 6, wherein the ring has a radial sealing surface in sliding engagement with the corresponding annular seal.

8. The BOV as defined in claim 6, wherein the annular seal is an axial compression seal.

9. A gas turbine engine comprising: a compressor having a gaspath bounded by a radially outer annular wall extending about an axis of the engine, the radially outer annular wall having a converging portion; a bleed off valve (BOV) having a ring axially translatable between a retracted position in which the ring closes an annular bleed off opening defined in the converging portion of the radially outer annular wall and a deployed position in which the ring protrudes forwardly into the gaspath; and an actuator operable to axially translate the ring between the retracted and the deployed positions, wherein the ring has a leading edge and a trailing edge downstream of the leading edge relative to a flow in the gaspath and located radially inwardly of the leading edge relative to the axis of the gas turbine engine, the leading edge and the trailing edge extending circumferentially around the axis of the gas turbine engine, gaps defined between the leading edge and the trailing edge of the ring and the radially outer annular wall when the ring is in the deployed position, both of the gaps fluidly connected to the annular bleed off opening, the ring having a gaspath facing surface between the leading edge and the trailing edge, the gas path facing surface being set even with the radially outer annular wall to close the annular bleed off opening when the ring is in its retracted position so as to form with the radially outer wall a continuous flow boundary surface, the gaspath facing surface being inclined relative to the axis so as to have a radial component and an axial component relative to the axis.

10. The gas turbine engine as defined in claim 9, wherein the BOV is disposed in a compressor section downstream of a compressor rotor.

11. The gas turbine engine as defined in claim 9, wherein the ring has a bleed off opening facing surface opposite to said gaspath facing surface thereof, the bleed off facing surface being configured to redirect an incoming flow through the annular bleed off opening.

12. The gas turbine engine as defined in claim 11, wherein the bleed off opening facing surface extends in a radially inwardly converging direction from the leading edge of the ring.

13. The gas turbine engine as defined in claim 12, wherein the bleed off opening facing surface extends from the radially inwardly converging direction to a radially outward direction.

14. A method of extracting water/hail particles and/or air from a core gaspath of a compressor of a gas turbine engine, the compressor rotatable about an axis, the method comprising: displacing axially a ring from a retracted position in which the ring closes a corresponding annular bleed off opening defined in a converging portion of a radially outer annular wall of the core gaspath to a deployed position in which the ring protrudes axially forwardly into the core gaspath to scoop water/hail particles and/or air out of the core gaspath via gaps defined between leading and trailing edges of the ring and fluidly connected to the annular bleed off opening, the trailing edge located downstream of the leading edge relative to a flow in the core gas path and radially inwardly of the leading edge relative to the axis, the ring having a gaspath facing surface between the leading and trailing edges to form a section of the radially outer annular wall when in its retracted position, the gaspath facing surface having an axial component and a radial component relative to the axis, the ring closing the annular bleed off opening directly at an outer flow boundary of the core gaspath and forming a continuous and smooth flow boundary surface between the gas path facing surface of the ring with a radially outer wall of the compressor.

15. The method as defined in claim 14, wherein displacing the ring from the retracted position to the deployed position comprises axially translating the ring in a forward direction away from the radially outer annular wall.

16. The method as defined in claim 14, wherein the ring has a bleed off opening facing surface, and wherein scooping comprises using the bleed off opening facing surface of the ring to deflect an incoming flow out of the core gaspath of the compressor.

17. The method as defined in claim 16, wherein deflecting comprises guiding the incoming flow along the bleed off opening facing surface of the ring from a radially inward direction to a radially outward direction.

18. The method as defined in claim 14, further comprising centrifuging incoming water and hail particles upstream of the ring.

19. The method as defined in claim 18, wherein centrifuging comprises passing the incoming water and hail particles through a low pressure compressor stage.

\* \* \* \* \*